US012609393B2

(12) United States Patent
Wexel et al.

(10) Patent No.: US 12,609,393 B2
(45) Date of Patent: Apr. 21, 2026

(54) HOUSING FOR A MOTOR VEHICLE BATTERY

(71) Applicant: PSA AUTOMOBILES SA, Poissy (FR)

(72) Inventors: Dirk Wexel, Rüsselsheim am Main (DE); Florian Heller, Rüsselsheim am Main (DE)

(73) Assignee: PSA Automobiles SA, Poissy (FR)

( * ) Notice: Subject to any disclaimer, the term of this patent is extended or adjusted under 35 U.S.C. 154(b) by 276 days.

(21) Appl. No.: 18/550,223

(22) PCT Filed: Feb. 2, 2022

(86) PCT No.: PCT/EP2022/052449
§ 371 (c)(1),
(2) Date: Sep. 12, 2023

(87) PCT Pub. No.: WO2022/194438
PCT Pub. Date: Sep. 22, 2022

(65) Prior Publication Data
US 2024/0170788 A1 May 23, 2024

(30) Foreign Application Priority Data

Mar. 15, 2021 (DE) ..................... 10 2021 202 476.9

(51) Int. Cl.
*B60K 1/04* (2019.01)
*B60L 50/60* (2019.01)
(Continued)

(52) U.S. Cl.
CPC ............ *H01M 50/249* (2021.01); *B60K 1/04* (2013.01); *B60L 50/64* (2019.02); *B60L 50/66* (2019.02);
(Continued)

(58) Field of Classification Search
CPC ...... B60K 1/04; H01M 50/24; H01M 50/262; H01M 50/271; H01M 2220/20; B60L 50/64; B60L 50/66
See application file for complete search history.

(56) References Cited

U.S. PATENT DOCUMENTS 7,427,093 B2     9/2008  Watanabe et al.
8,387,733 B2 *   3/2013  Nakamura .............. B60L 50/66
                                                        180/68.5
(Continued)

FOREIGN PATENT DOCUMENTS

DE      10 2013 200782 B4     1/2021
EP             1992513 A1    11/2008
EP             2017919 B1     1/2013

OTHER PUBLICATIONS

International Search Report to PCT/EP2022/052449 mailed May 6, 2022.
Written Opinion to PCT/EP2022/052449 mailed May 6, 2022.

*Primary Examiner* — Jason D Shanske
*Assistant Examiner* — James J Triggs
(74) *Attorney, Agent, or Firm* — Sandberg Phoenix & von Gontard, PC

(57) ABSTRACT

The present development relates to a housing (11) for a motor vehicle battery (12), comprising:—a housing body (40) for forming a cavity (60) for receiving the motor vehicle battery (12),—wherein the housing body (40) has a bottom side (13), by means of which the housing body (40) can be fixed to the floor (8) of a motor vehicle (1), and—wherein the housing body (40) has an upper side (15) which has a plurality of fastening points (57) for one or more motor vehicle seats (5, 6).

20 Claims, 7 Drawing Sheets

(51) Int. Cl.

| | |
|---|---|
| *B60L 50/64* | (2019.01) |
| *H01M 50/249* | (2021.01) |
| *H01M 50/262* | (2021.01) |
| *H01M 50/271* | (2021.01) |
| *B60N 2/005* | (2006.01) |

(52) U.S. Cl.
CPC ....... *H01M 50/262* (2021.01); *H01M 50/271* (2021.01); *B60K 2001/0422* (2013.01); *B60N 2/005* (2013.01); *H01M 2220/20* (2013.01)

(56) References Cited

U.S. PATENT DOCUMENTS

| | | |
|---|---|---|
| 2009/0320715 A1 | 12/2009 | Morita et al. |
| 2013/0299257 A1 | 11/2013 | Erlacher et al. |
| 2015/0050530 A1 | 2/2015 | Seimiya |
| 2019/0081298 A1* | 3/2019 | Matecki .................. B60R 19/12 |

* cited by examiner

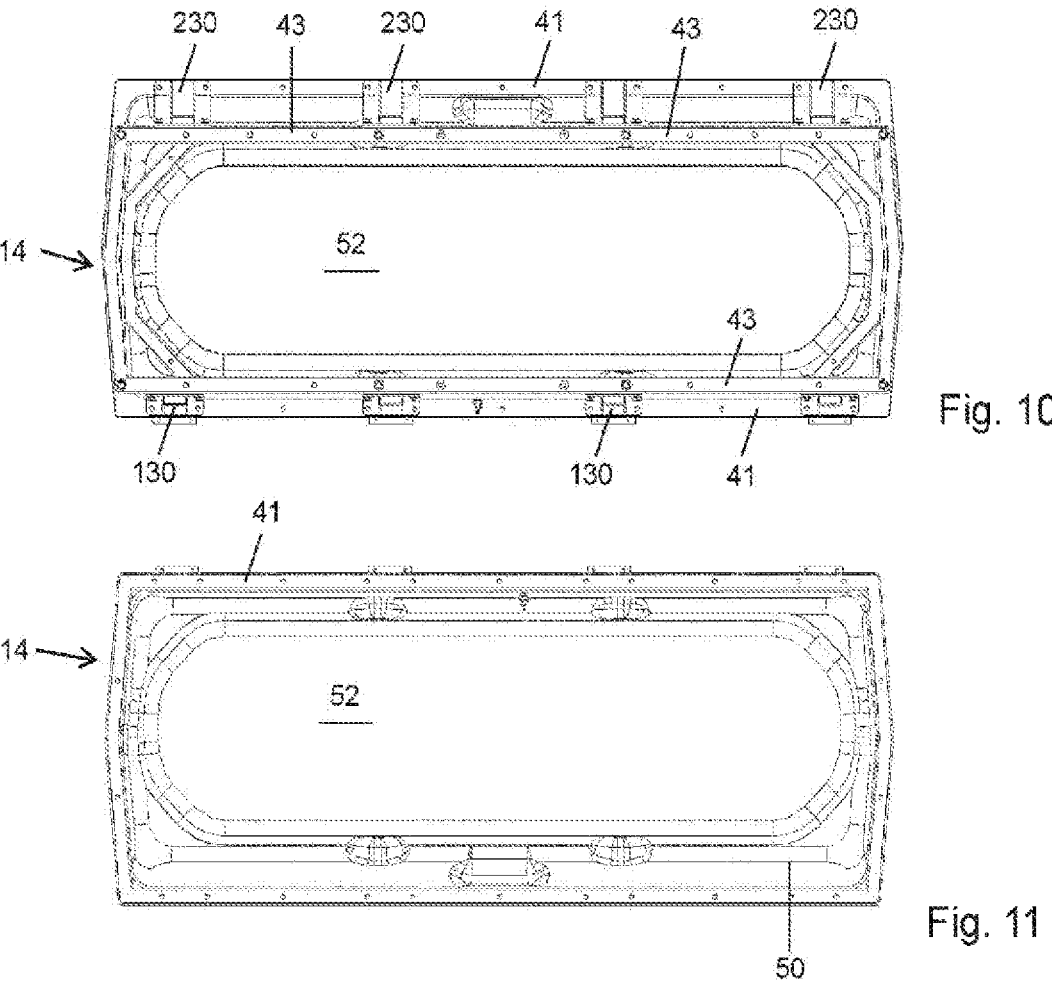
Fig. 10
Fig. 11
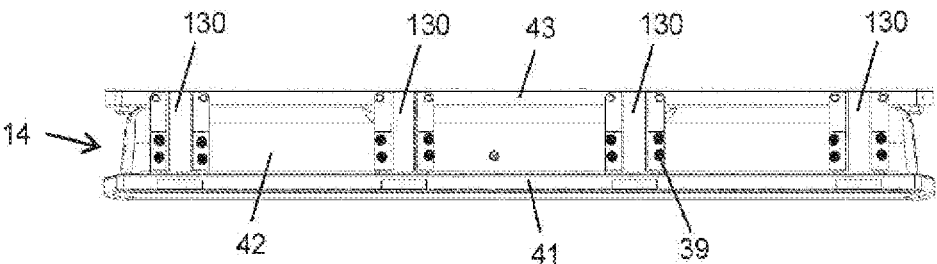
Fig. 12

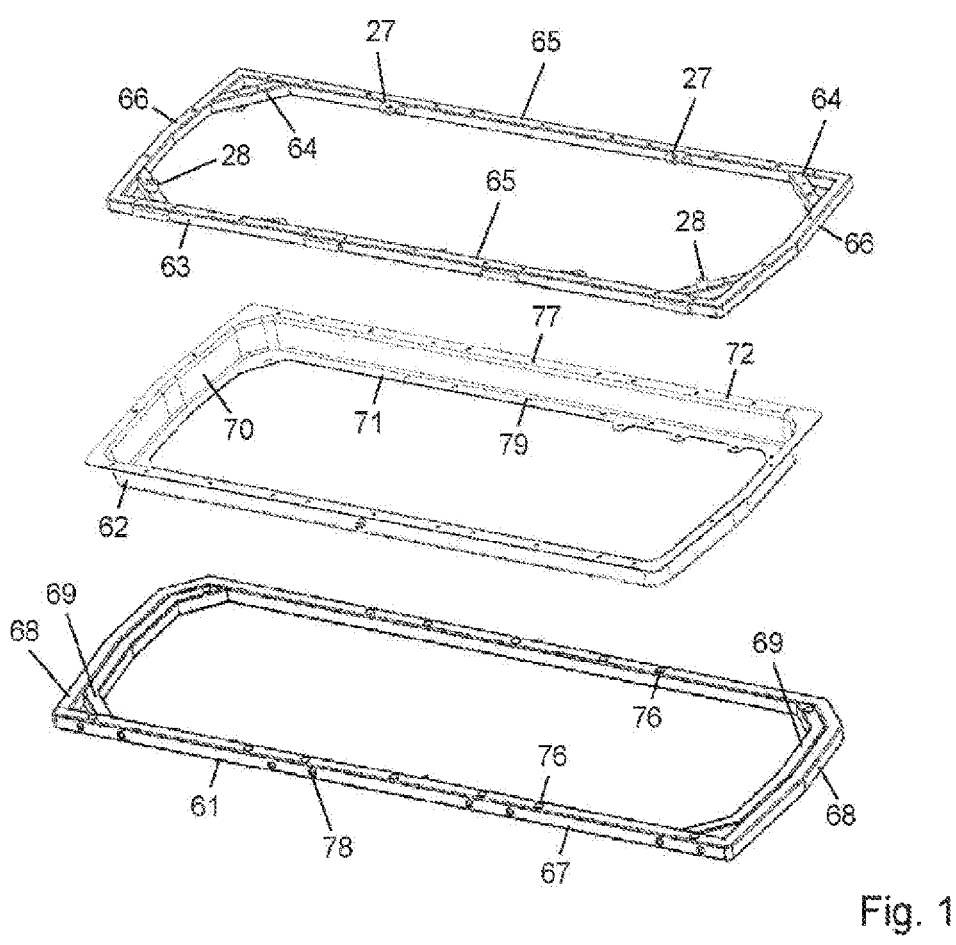
Fig. 13
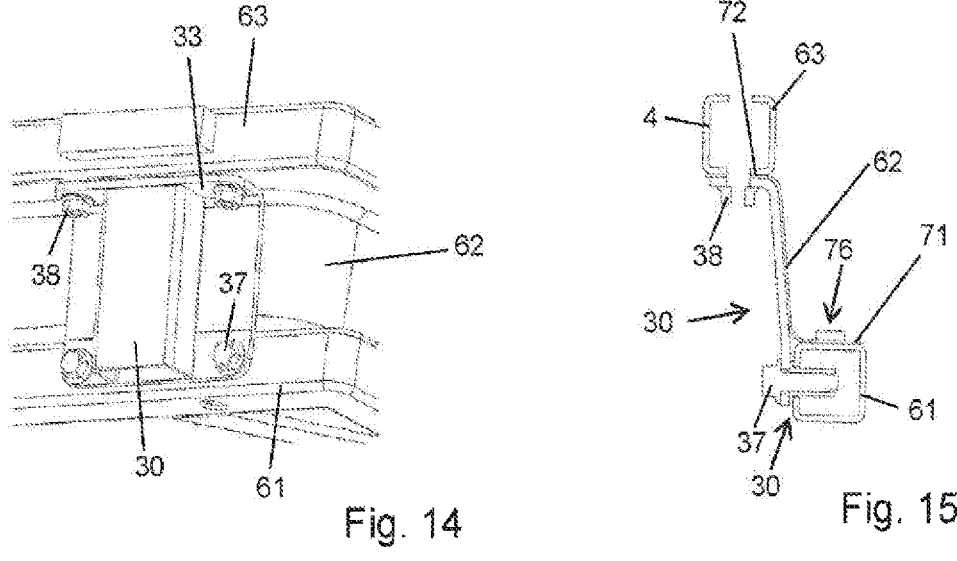
Fig. 14
Fig. 15

HOUSING FOR A MOTOR VEHICLE BATTERY

CROSS-REFERENCE TO RELATED APPLICATIONS

This application is the US National Stage under 35 USC § 371 of International Application No. PCT/EP2022/052449, filed Feb. 2, 2022, which claims the priority of German application 10 2021 202 476.9 filed on Mar. 15, 2021, the content of both said applications being incorporated herein by reference.

BACKGROUND

The present development relates to a housing for a motor vehicle battery, and to a battery unit equipped with such a housing, for a motor vehicle, in particular for a hybrid vehicle or a purely electrically operated motor vehicle. In a further aspect, the development relates to a correspondingly equipped motor vehicle.

The use and implementation of high-performance batteries in motor vehicles provides for particular challenges with regard to crash safety of such motor vehicles. In the event of a motor vehicle collision, it should be widely ensured that a motor vehicle battery remains as undamaged as possible, so that the uncontrolled escape of chemicals or similar hazardous substances of the battery can be effectively prevented, even in the event of a motor vehicle collision. Furthermore, it is generally desirable to accommodate motor vehicle batteries in the motor vehicle in as space-saving a manner as possible, and in this case to also take into account or to optimize the center of gravity of the motor vehicle.

For example, U.S. Pat. No. 7,427,093 B2 discloses the accommodation of a vehicle battery and voltage electronics under the front passenger seat of a passenger car.

In contrast, the object of the present development is that of providing an improved, thus space-saving, accommodation of a motor vehicle battery in the motor vehicle, and in the process to further increase the crash safety of the motor vehicle. Furthermore, the battery is intended to be better protected against any vehicle collisions.

SUMMARY

This object is achieved by means of a housing for a motor vehicle battery, by means of a battery unit, and by means of a motor vehicle, according to the features of the independent claims. In this case, advantageous embodiments are in each case the subject matter of dependent claims.

In one aspect, a housing for a motor vehicle battery is provided. The housing comprises a housing body defining a cavity. The cavity is designed to receive the motor vehicle battery. The housing body has a bottom side, by means of which the housing body can be fixed to a floor of a motor vehicle. Furthermore, the housing body has an upper side opposite the bottom side. A plurality of fastening points for at least one motor vehicle seat is provided or formed on the upper side.

The housing fulfills a dual function in this case. It functions on the one hand as an enclosure for the motor vehicle battery. On the other hand, it functions as a supporting structure for the at least one motor vehicle seat. At least one motor vehicle seat can be arranged and/or fastened on the motor vehicle body, in particular on the floor of the motor vehicle body, via the battery housing. It can be provided that the at least one motor vehicle seat is connected to the bodywork exclusively via the battery housing. In this respect, the battery housing can be virtually integrated into the motor vehicle body.

The battery housing has in particular a sufficiently high stability and torsional stiffness for the seat assembly. The battery housing functions as a supporting component of the motor vehicle body, so to speak. In this respect, it is sufficiently structurally reinforced. In addition to a seat assembly, the battery housing can also provide a stable and collision-proof enclosure for the battery.

Typically, the battery housing can be fastened to the upper side of the floor of the motor vehicle. The housing is thus located in the motor vehicle interior or on a side of the motor vehicle floor facing the motor vehicle interior. The housing can in particular extend over the entire width of the motor vehicle body. Thus, for example, the two front seats can be fastened to the upper side of the housing. All the connection points of the front seats can be structurally connected to the motor vehicle body via the battery housing. In this respect, no separate seat fastening points for the front seats are required in the interior of the motor vehicle body.

According to a further embodiment, the housing has at least one peripheral frame surrounding the cavity. The frame can be a frame which is closed in the peripheral direction and which typically extends in the plane formed by the vehicle longitudinal direction (x) and vehicle transverse direction (y). A peripheral and possibly closed frame enclosing the cavity can give the housing the required degree of mechanical stability. By way of example, a structural connection of the battery housing to the motor vehicle floor can take place via the frame. Additionally or alternatively, a connection of the at least one motor vehicle seat to the battery housing can also take place via the peripheral frame surrounding the cavity.

In some embodiments, a plurality of frames can be provided, which, for example, are oriented in parallel with one another and are spaced apart from one another along the vertical axis (z) of the vehicle. Thus, for example, a connection of the housing to the vehicle floor can be achieved via a first frame. By means of a second frame, which is fixedly connected to the first frame, for example a connection of the at least one motor vehicle seat to the housing of the battery can take place.

According to a further embodiment, the housing body is hermetically sealed towards the upper side. This is advantageous in particular for the arrangement of the battery housing in the interior of the motor vehicle. In this way, the hermetic seal to the upper side of the housing body prevents the penetration of gases or liquids into the motor vehicle interior, for example in the event of damage to or failure of the motor vehicle battery.

According to a further embodiment, the housing body has a bottom part which is structurally connectable to the floor of the motor vehicle body. In this respect, the housing body can in particular be formed in multiple parts. It can have the mentioned bottom part and an upper part that is designed to be corresponding or complementary thereto. The connection of the upper part and bottom part forms the cavity, closed towards the outside, for receiving the motor vehicle battery.

The bottom part can be designed without a floor. In particular, it can be virtually closed, downwards, by the connection to the floor of the motor vehicle body. In the interior and housing, the motor vehicle floor can have one or more through-openings, for example for functional connection of the battery to consumers or to a charging infrastructure. Furthermore, through-openings functioning for example as a ventilation opening can also be provided in the motor vehicle floor, within the bottom part. Via such through-openings, the cavity of the battery housing can virtually be connected to the external environment of the motor vehicle. Any overpressure in the interior of the cavity of the battery housing can escape via such a ventilation opening.

Furthermore, current-conducting cables, for example low-voltage or high-voltage lines, can be guided into the cavity of the housing via one or more through-openings, in order to electrically connect the motor vehicle battery accommodated in the cavity. In addition, various media guides, for example fluid-conducting lines, can extend over the motor vehicle floor, in order to cool or heat the motor vehicle battery in order to thereby provide ideal thermal conditions for the operation of the motor vehicle battery.

According to a further embodiment, the bottom part has a first frame, by means of which the bottom part can be fixed to the floor. The first frame can terminate with the bottom side of the bottom part, or be designed to be flush therewith. In this way, the first frame can be structurally connected to the floor of the motor vehicle. The connection of the first frame to the motor vehicle floor can take place through the motor vehicle floor. For example, the first frame can be connected to the motor vehicle floor by means of a screw connection, via a plurality of fastening points. In this case, the first frame can be screwed from below through the motor vehicle floor. However, it is also conceivable to structurally connect the first frame to the motor vehicle floor from above, by means of a plurality of screws or similar fastening elements.

According to a further embodiment, the bottom part has a second frame which is structurally connected to the first frame. The second frame can be spaced apart from the first frame in relation to the motor vehicle vertical axis (z). The first frame and the second frame may be oriented substantially in parallel with one another. In particular, the second frame can mark, form, or end flush with an upper end or an upper side of the bottom part.

Between the first frame and the second frame, a side wall structure, thus a side wall element, can be arranged, which is typically connected both to the first frame and to the second frame in a gas-tight and/or fluid-tight manner. The side wall element can in particular form a closed side wall structure. The side wall element can be designed, for example, as a deep-drawn one-piece metal sheet which is continuously connected by a bottom end portion to the first frame and which is continuously connected by an upper end portion to the second frame.

According to a further embodiment, the first frame and the second frame are structurally interconnected by means of a plurality of connectors. The individual connectors can, in particular, be connected both to the first frame and to the second frame along longitudinal sides extending in parallel, which extend, for example, in the transverse direction of the vehicle. The connectors may be connecting struts that provide a structural connection between the first frame and the second frame.

The first frame and the second frame can each be designed as substantially rectangular frames. A longitudinal side of the frames typically extends in the transverse direction of the vehicle. An end face or a short side of the rectangular frame typically extends in the longitudinal direction of the vehicle. The connectors are preferably arranged on the long sides. The end faces can be designed to be free of connectors. In this respect, the frame can have a longitudinal or transverse extension in the transverse direction of the vehicle, which substantially corresponds to the entire vehicle width.

Individual connectors can, for example, have a structure-reinforcing profile portion and a connection plate structurally connected thereto, optionally having one or more flange portions, which can provide a particularly good and lasting connection to the respective first and/or second frame.

According to a further embodiment, the housing, therefore the housing body, has an upper part that is structurally connectable to the at least one motor vehicle seat. The upper part can be structurally connected to the bottom part, in order to form the cavity which is closed towards the motor vehicle interior. It is provided, in terms of assembly technology, to first fasten the bottom part to the motor vehicle body, therefore to the floor of the motor vehicle body, and then to insert the motor vehicle battery into the bottom part and, if necessary, to connect it firmly, i.e. structurally, to the bottom part, for example by screwing. Then, the upper part can be placed on the bottom part, in order to close the cavity, surrounding the battery, towards the top, i.e. towards the inside of the motor vehicle interior. Then, and after assembly of the battery housing has been completed, the at least one motor vehicle seat can then be fastened to the upper side of the housing body.

According to a further embodiment, the upper part has a third frame, on which the fastening points for the at least one motor vehicle seat are formed. The third frame can in particular terminate flush with the upper side of the housing, in order to enable unhindered connection of the at least one motor vehicle seat. The fastening points for the at least one motor vehicle seat can in particular be designed to receive seat rails of the at least one motor vehicle seat or to provide corresponding connection points for seat rails of the at least one motor vehicle seat. The at least one motor vehicle seat can then be fastened and fixed to the fastening points of the upper part, via the seat rails.

According to a further embodiment, the upper part has a fourth frame, which is structurally connected to the third frame. In relation to the vehicle vertical axis, the fourth frame is located below the third frame. The fourth frame can in particular form a bottom end or a bottom plane of the upper part. The third frame and the fourth frame may be oriented in parallel with one another. In particular, a connection of the bottom part to the second frame is possible and provided via the fourth frame. In this way, the upper part and the bottom part can be structurally, stably and permanently connected to one another.

According to a further embodiment, the third frame and the fourth frame are structurally interconnected by means of a plurality of connectors. These connectors can also be designed similarly to the connectors between the first and the second frame. They typically have a supporting or load-transmitting profile portion, and a connection plate, which can optionally also have one or more connecting flange portions, via which a particularly stable and lasting, as well as torsion-resistant, mutual connection of the third and fourth frame can be made possible.

According to a further embodiment, the upper part has an upwardly closed one-piece lid trough. The lid trough can have a lateral wall or cheek portion which extends substantially between the third and the fourth frame. Furthermore, the lid trough can have an upper cover portion which is integrally connected to the side wall or the cheek portion. The one-piece lid trough can be designed as a deep-drawn metal component, in particular as a deep-drawn metal sheet. The lid trough can in particular terminate towards the bottom with the fourth frame, and thus form an enclosure for the cavity of the battery housing that is closed towards the top. A structural connection to the third frame, located above, is not absolutely necessary.

According to a further embodiment, it is provided that the bottom part and the upper part can be structurally interconnected by a connection of the second frame to the fourth frame. The second frame forms an upper end portion of the bottom part. The fourth frame forms a bottom end portion of the upper part. In a final mounting position, the fourth frame can rest on the second frame and thus largely be connected to the second frame over its entire frame geometry.

A seal can be inserted between the second and the fourth frame, also in order to provide hermetic sealing of the cavity with respect to the interior of the motor vehicle. In a final assembly configuration, the second and the fourth frame can be fixedly screwed or riveted to one another. In this respect, the second frame has a plurality of fastening points, which are arranged and formed having mating fastening points of the fourth frame that are complementary thereto or that correspond thereto.

According to a further aspect, the present development relates to a battery unit for a motor vehicle. The battery unit has a previously described housing, and a battery arranged in the cavity of the housing. The housing is in particular connected or connectable to the floor of a motor vehicle. This is a structural, i.e. load-transmitting, connection, which in particular also enables the fastening and connection of the at least one motor vehicle seat to the upper side of the housing of the battery.

According to a further aspect, the present development also relates to a motor vehicle comprising a motor vehicle body. The motor vehicle body has a motor vehicle interior which functions as a passenger compartment. The motor vehicle is also equipped with a previously described housing for a motor vehicle battery, and/or with a corresponding battery unit. The previously described housing is arranged and fixed on a side of a floor of the motor vehicle body facing the interior. Furthermore, mounting or fastening and/or fixing of the at least one motor vehicle seat takes place via the housing.

The particularly stable design of the battery housing and the particularly stable enclosure for the motor vehicle battery, connected thereto, fulfills a dual function. On the one hand, it enables a particularly space-saving arrangement and fastening of the at least one motor vehicle seat. On the other hand, the particularly stable mechanical structure of the battery housing can protect the battery against any damage in the event of a motor vehicle collision. Furthermore, the hermetic seal of the housing directed upward, i.e. towards the motor vehicle interior, can provide effective protection for the vehicle occupants against hazardous materials escaping from the battery.

BRIEF DESCRIPTION OF THE FIGURES

Further objectives, features and advantageous possible applications are described in the following exemplary embodiment with reference to the drawings. In the drawings:

FIG. 10 is a plan view of the upper part from above.

FIG. 11 is a plan view of the upper part from below.

FIG. 12 is a side view of the upper part.

FIG. 13 is an exploded view of the components of the bottom part of the battery housing.

FIG. 14 is an enlarged perspective view of the side edge of the bottom part.

FIG. 15 is a cross section through the arrangement according to FIG. 14.

DETAILED DESCRIPTION

Figure 1:
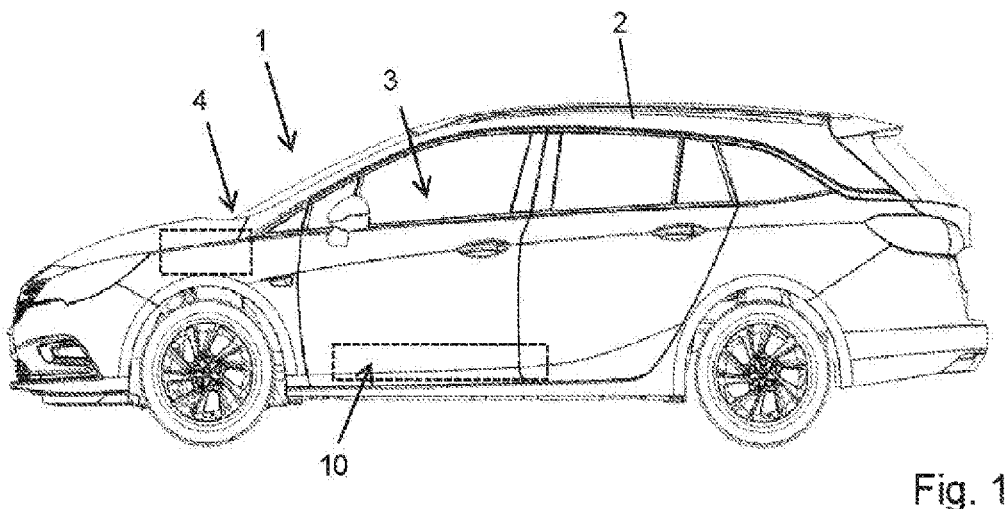
FIG. 1 is a schematic side view of a motor vehicle.
Figure 2:
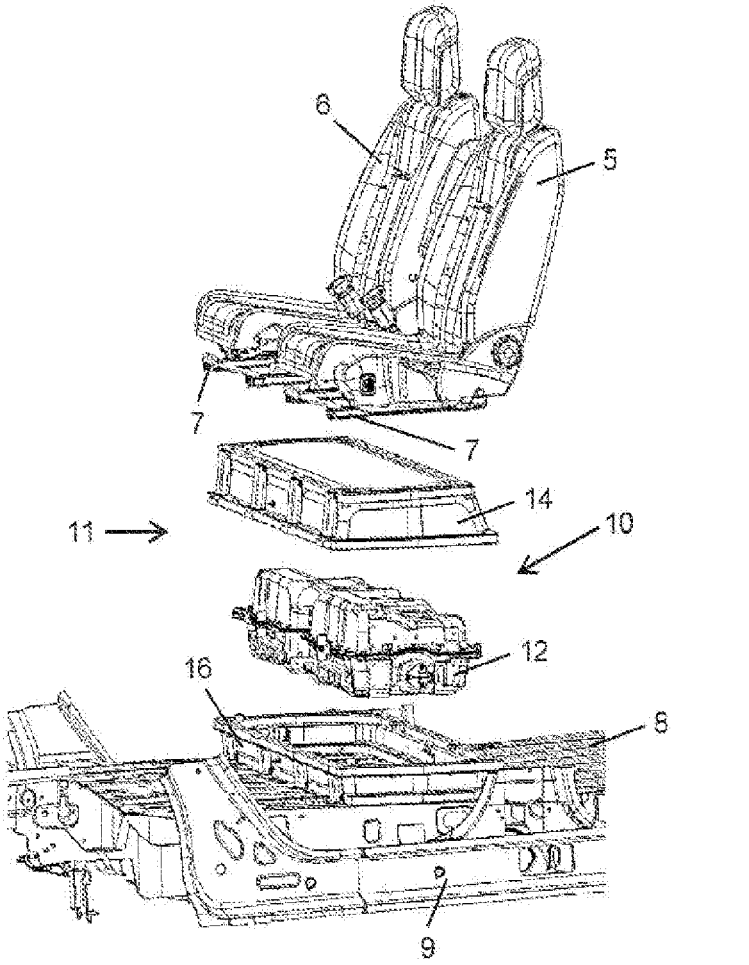
FIG. 2 is an exploded view of the vehicle floor, battery housing and motor vehicle seats.

FIG. 1 shows a motor vehicle 1 which has a motor vehicle body 2 comprising a motor vehicle interior 3. The motor vehicle 1 is designed as a passenger car. It has a drive 4, typically an electric drive 4, and a battery unit 10. The battery unit 10 comprises a rechargeable battery 12. The battery 12 is designed, for example, as a traction battery. It provides electrical power or electrical energy, in order to supply the drive 4 of the motor vehicle 1 with electrical energy.

The battery unit 10 has a housing 11 for the motor vehicle battery 12. The battery housing 11 is fastened in particular to the floor 8 of the motor vehicle body 2. The battery housing 11, which is shown in a perspective view for example in FIG. 4, comprises a battery body 40 having a bottom side 13 and having an opposite upper side 15. The battery housing 11 can be fastened to an upper side of the motor vehicle floor 8 by means of the bottom side 13. A plurality of fastening points 57 for the at least one motor vehicle seat 5, 6 are formed and provided on the upper side 15 of the battery housing 11.

The individual fastening points 57 serve to connect seat rails 7, along which the vehicle seats 5, 6 are displaceably mounted. By fastening the bottom side 13 of the battery housing 11 to the motor vehicle floor 8, and by providing fastening points 57 on the upper side 15 of the battery housing 11 for the at least one motor vehicle seat 5, 6, the housing 11 fulfills a dual function. On the one hand, it provides a particularly stable and protective enclosure for the battery 12. At the same time, the housing 11 acts as a connecting structure and fastening structure for the at least one motor vehicle seat 5, 6.

Figure 3:
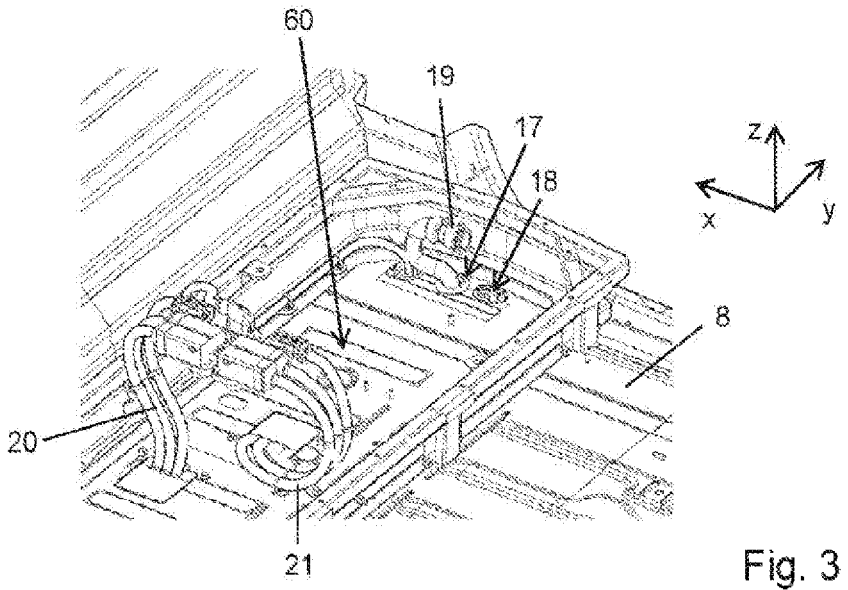
FIG. 3 is a perspective view of the bottom part of the battery housing in the mounting position on the motor vehicle floor.

The battery housing 1, or its housing body 40, forms a cavity 60, shown schematically in FIG. 3, in which the battery 12 can be arranged. As shown in particular in FIG. 3, the battery housing 11 does not have its own floor. It can be designed without a floor, as it were.

The cavity 60 can thus be delimited towards the bottom by an upper side of the motor vehicle floor 8. The housing body

40 can extend on the floor 8, between the side rockers 9 opposite the vehicle transverse direction (y).

As shown in particular in FIG. 3, one or more through-openings 17, 18 are formed in the motor vehicle floor 8, via which through-openings for example a media guide 19 or various cables 20, 21 can be guided from below, through the motor vehicle floor 8, into the cavity 60 of the housing 11. The media guide 19 typically serves to guide or circulate a cooling medium, in order to cool or heat the battery 12 located in the cavity 60 to a predetermined temperature level.

Furthermore, a through-opening 18 can be configured in the floor 8, and is provided, for example, with an overpressure valve. If, for example, a gas or fluid pressure occurs in the interior of the cavity 60 which is hermetically sealed towards the top, a corresponding overpressure can escape to the outside via the through-opening 18 and via a pressure relief valve optionally provided there.

In the embodiment shown in FIG. 2-19, the housing 11 has an upper part 14 and a bottom part 16. The upper part 14 is connectable, in particular structurally connectable, to the bottom part 16. The bottom part 16 is structurally connectable to the vehicle floor 8. As schematically illustrated in particular in FIG. 5, the bottom part 16 has a first frame 61 and a second frame 63. The first frame 61 forms, as it were, the bottom side 13 of the housing 11. The bottom part 16 can be fastened to the upper side of the motor vehicle floor 8 via the first frame 61. The frame 61 is designed as a peripheral frame. It surrounds the cavity 60 in a peripheral direction, i.e. in a plane formed by the motor vehicle longitudinal axis (x) and the motor vehicle transverse axis (y).

The first frame 61 is substantially rectangular. It has two longitudinal portions 67, which extend in parallel with one another and are oriented substantially in the transverse direction (y) of the vehicle, and two end-face portions 68, which likewise extend in parallel with one another or are formed so as to be complementary to one another, as shown in FIG. 13.

The opposite end-face portions 68 and the longitudinal portions 67 form a substantially rectangular frame. On the inside, i.e. facing the interior of the frame 61, the end-face portions 68 can still be provided by means of a separate reinforcement 69. In particular, the end-face portions 68 can be provided with an internal doubling. The end-face portions 68 and also the longitudinal portion 67 can, as such, have a hollow profile which, as a whole, imparts a high degree of structural and torsional rigidity to the frame 61.

Figures 5, 6:
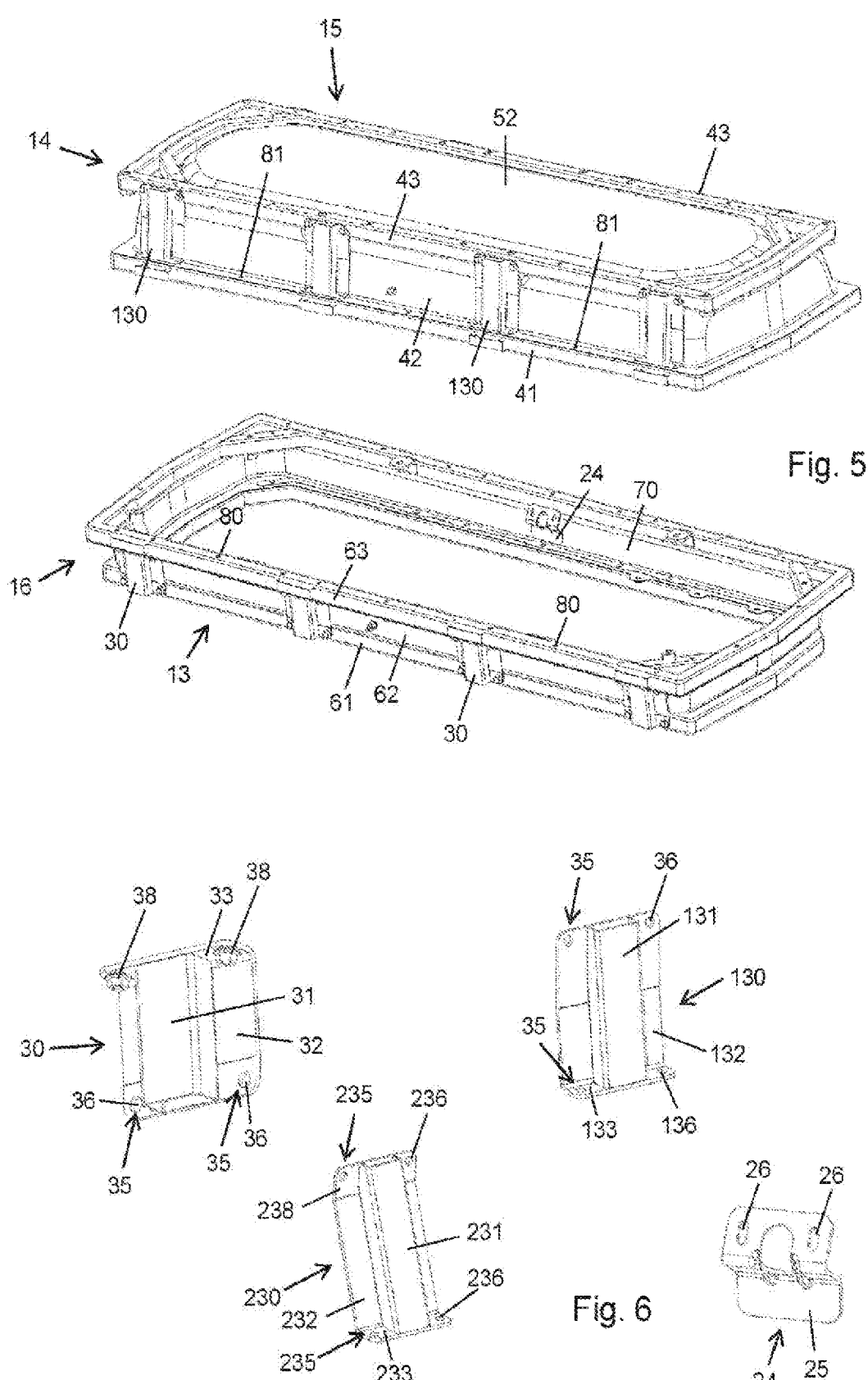
FIG. 5 is a perspective view of the upper part and the bottom part of the battery housing.
FIG. 6 shows various embodiments of connectors for various frames of the upper part and the bottom part.

The bottom part 16 further comprises a second frame 63. The second frame 63 typically extends in parallel with the first frame 61. The second frame 63 can virtually form an upper side of the bottom part 16, as shown in FIG. 5. The second frame 63 likewise has two opposite longitudinal portions 65 and two end-face portions 66 extending therebetween. The second frame 63 can in each case have a reinforcing strut 64 in the transition region between the longitudinal portions 65 and the end-face portions 66. Just like the first frame 61, the second frame 63 also has a hollow profile which surrounds or encloses the cavity 60 in the peripheral direction.

A side wall element 62 is also provided between the first frame 61 and the second frame 63. As shown in FIG. 13, the side wall element can form a peripheral closed side wall 70. On a bottom side facing the first frame 61, the side wall element 62 has an inwardly projecting peripheral flange 71. The side wall element 62 has an outwardly projecting flange 72 on its upper side or the second frame 63.

In the mounting position, it is provided that the flange 71 rests on an upper side of the first frame 61 and is screwed or glued there by means of separate connecting elements, for example to the first frame 61. Towards the top, the outwardly projecting flange 72 can come to lie on the bottom side of the second frame 63 and be correspondingly welded, glued or screwed there to the frame 63. In the region of its flange portions 71, 72, the side wall element 62 can in each case be provided with a separate seal, in order to provide a hermetically sealing connection between the frames 61, 63 and the side wall element 62.

Furthermore, it can be provided that a sealing adhesive is provided in the region of the flange portions 71, 72, such that a hermetically sealed connection between the frames 61, 63 and the side wall element 62 can be formed. A plurality of connectors 30 is provided for the mutual connection of the first frame 61 and the second frame 63.

Such a connector 30 is shown in detail in FIGS. 6, 14 and 15. The connector 30 has an elongate profile portion 31 which is provided with a connection plate 32 which extends over the entire length of the profile portion 31. The connection plate projects laterally from the profile portion 31, which is designed as a square profile, for example. At a longitudinal end of the profile portion 31, the connection plate 32 merges into a flange portion 33, which at the same time also closes the longitudinal end of the profile portion 31. Two fastening elements 38 are provided outside the profile portion 31, at an upper end of the connection plate 32, and thus on the flange portion 33. This can be, for example, a weld nut welded onto the flange portion 33.

In the mounting position, these fastening elements 38 come to rest on the bottom side of the second frame 63 in a manner flush with complementarily or correspondingly designed fastening points. Individual fastening points 35, in the present case in the form of through-openings 36, are provided on opposite outer sides of the connection plate 32, on the end of the connection plate 32 which is located at the bottom and faces away from the flange portions 33.

These come into contact with corresponding mating fastening points formed on the outer side of the first frame 61. As shown for example in cross section in FIG. 15, corresponding nuts or rivet connections can be guided through the through-openings 36 and screwed or riveted to the first frame 61. A corresponding fastening element 37 is shown schematically in the cross section of FIG. 15. The first frame 61 thus has outwardly facing fastening points 78 for the fastening elements 37 in the two longitudinal portions 67. Corresponding fastening points 76 for the side wall element 62 are provided on the upper side of the first frame 61. In a manner complementary and corresponding to the fastening points 76, corresponding fastening points 79, for example in the form of through-openings, are provided in the region of the flange portion 71.

A plurality of fastening points 77 is provided on the upper flange portion 72, and come to lie on the bottom side of the second frame 63, in a manner approximately flush with fastening points corresponding thereto.

One or more angle brackets 27 for the connection and fastening of the battery 12 can be provided on the second frame 63, which is structurally connected to the first frame 61 via a plurality of connectors 30. The angle brackets 27 can protrude inward from the frame 63 and provide corresponding fastening points for corresponding mating fastening points of the battery 12. In the region of the struts 64 one or more spacers 28 can be formed or arranged, on which the battery 12 can rest and can be held at a distance accordingly.

In the illustration according to FIG. 5, it is further shown that one or more retaining brackets 24 can be arranged on the inner side of the bottom part 16. The retaining bracket 24, which is shown again enlarged in FIG. 6, has, for example, a flange portion 25, by means of which the retaining bracket 24 can be fixed to the inside of the side wall element 62 and/or to an upper side of the first frame 61. At an end facing away from the flange portion 25, the retaining bracket 24 has one or more through-openings in the form of cable guides 26, through which the cables 20, 21 provided for operation of the battery 12 can ultimately be guided, as per FIG. 3, and thus fixed in the cavity 60.

The upper part 14 also has two frames 41, 43, in the present case referred to as a third frame 43 and a fourth frame 41. The fourth frame 41 forms a bottom side of the upper part 14. The third frame 43 forms an upper side of the upper part 14. The fourth frame 43 has two longitudinal portions 45 extending in parallel with one another, and two end-face portions 46 that connect the longitudinal portions 45 to one another. The end-face portions 46 can also be reinforced here with a strut 44 or with a doubling.

A plurality of fastening points 57 for the seat rails 7 of the at least one motor vehicle seat 5, 6 are formed on the upper side of the peripheral third frame 43. The fourth frame 41 also has a substantially rectangular structure having two longitudinal portions 47 extending in parallel with one another, and the longitudinal portions have connecting end-face portions 48 on the longitudinal ends thereof. The third frame 43 and the fourth frame 41 extend substantially in parallel with one another.

They are structurally connected to one another via a plurality of connectors 130, 230. In particular, the longitudinal portions 47, 45 of the fourth and third frame 41, 43 pointing in the direction of travel of the motor vehicle 1 are structurally connectable or connected to one another by means of a plurality of mutually spaced connectors 130. Similarly to the connectors 30, the connectors 130 also each have an inner profile portion 131 and a connecting plate 132 extending laterally from the profile portion 131 over the entire length of the profile portion 131.

The connection plate 132 has an outwardly projecting flange portion 133 at the end lying at the bottom and facing the fourth frame, comprising two external fastening points 135 in the form of through-openings 136. Opposite, i.e. facing the upper side or the third frame 43, the connection plate 132 has a corresponding fastening point which corresponds to external fastening points 58 of the third frame 43. As shown in particular in the cross section of FIG. 9, the fastening points 135 can be arranged on the upper end portion of the connection plate 132, in alignment with the fastening points 58 of the third frame 43, in order to produce a mutual connection between the connection plate 132 and the third frame 43 by means of suitable fastening elements 37, for example in the form of screws or rivets. The connection plate 132 rests against the outside of the longitudinal portion 45 of the third frame 43 facing in the direction of travel. The flange portion 133 protruding outwards or forward is supported on an upper side of the fourth frame 41.

Here, a plurality of fastening points 49, for example in the form of through-openings, are provided on the upper side of the fourth frame 41, said fastening points coming to lie in alignment with through-openings in the region of the flange portion 133. A mutual connection can also take place here by means of screws or by means of rivets.

Furthermore, an outwardly projecting flange 51 of a lid trough 42 rests on the upper side of the fourth frame 41. The lid trough 42, which is shown in perspective view in FIG. 7, has a cover portion 52 that is hermetically sealed upwards, and a peripheral side wall 50. The flange 51 projects outwards on the side of the side wall 50 facing away from the cover portion 52. It is designed in a manner corresponding to the geometry of the fourth frame 41.

The flange 51 can thus rest over the entire surface of the upper side of the fourth frame 41. A plurality of fastening points 59, which correspond approximately to the fastening points 49 for the connectors 130, can be provided in the region of the flange 51.

Figures 7, 8, 9:
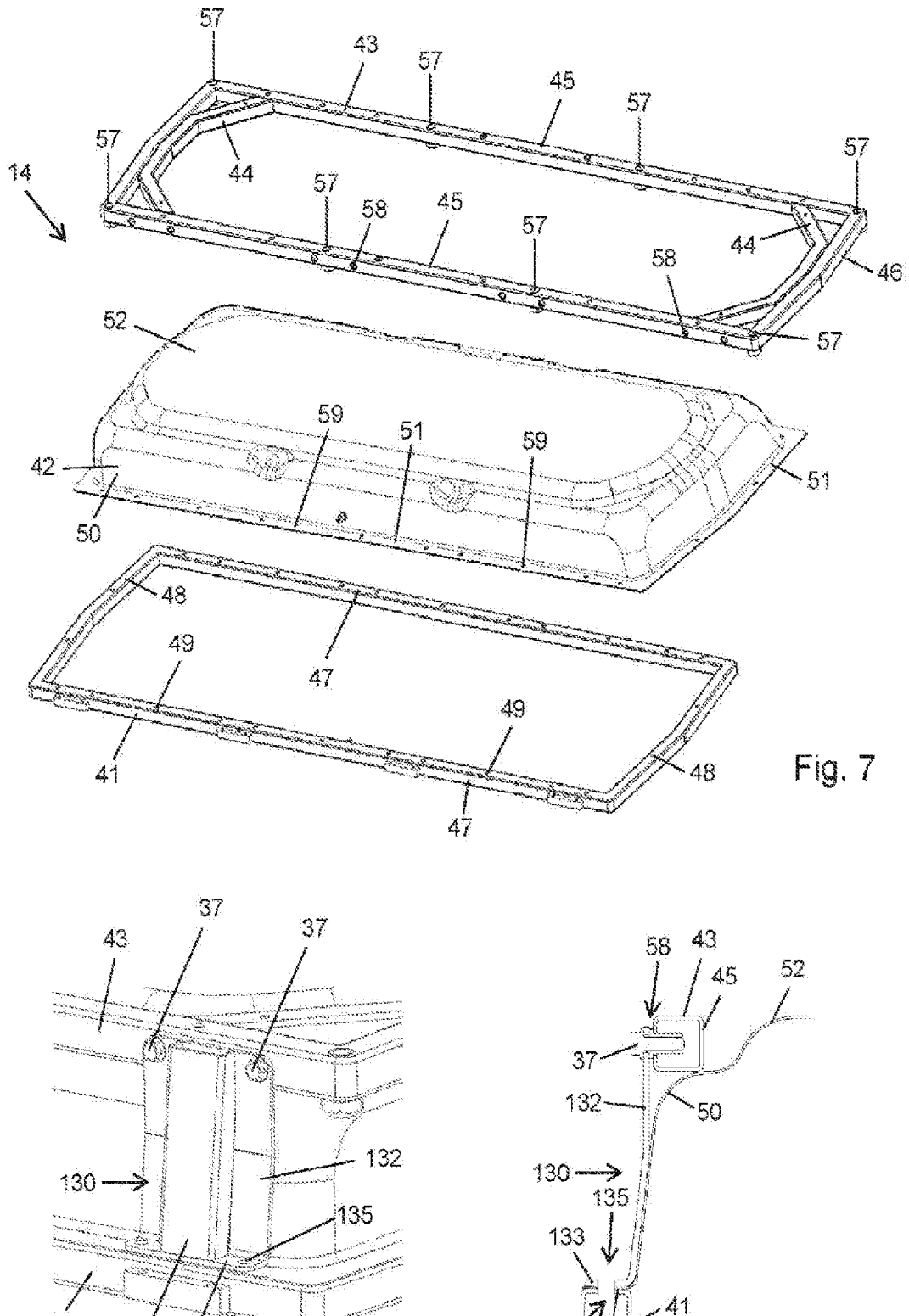
FIG. 7 is an exploded view of the individual components of the upper part of the battery housing.
FIG. 8 is an enlarged perspective view of the side edge of the upper part of the battery housing.
FIG. 9 is a cross section through the arrangement according to FIG. 8.
Figure 16:
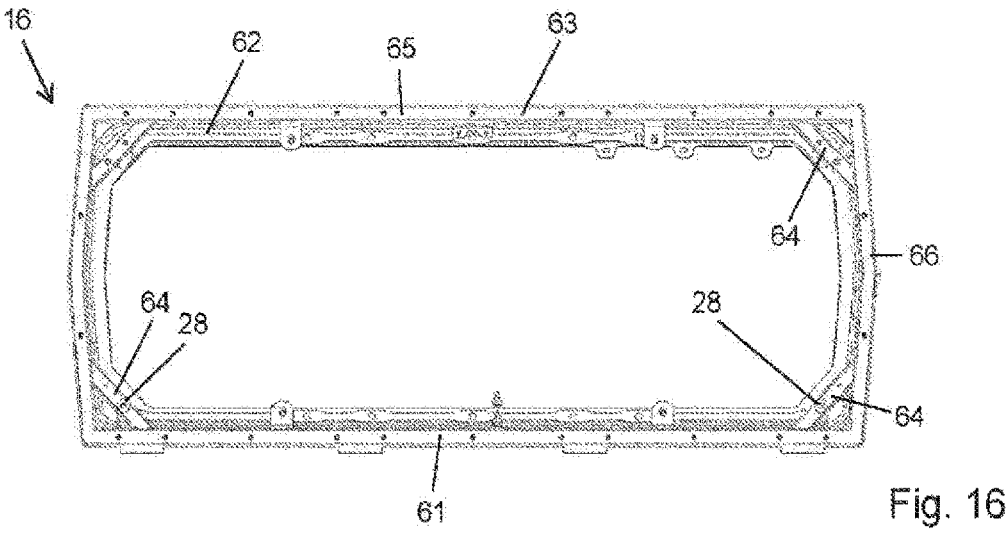
FIG. 16 is a plan view of the bottom part, viewed from above.
Figure 17:
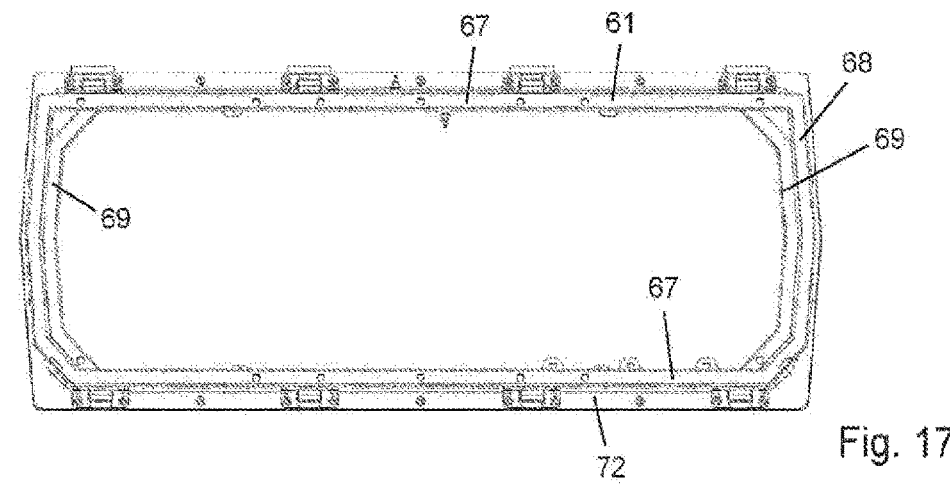
FIG. 17 is a plan view of the bottom part, viewed from below.

As shown in particular in FIG. 9, the flange 51 rests on top of the upper side of the fourth frame 41. The connection plate 132 extends externally along the side wall 50. The side wall 50 has a structure that tapers upwards and extends inwards, past the third frame 45, and merges in one piece into the cover portion 52.

Between the flange 51 and the fourth frame 41, an adhesive connection may be provided, optionally with addition of a seal, in order to provide a sealing arrangement between the trough 42 and the fourth frame 41.

A plurality of connectors 230, which are shown for example in FIG. 6, are likewise provided along the longitudinal portion 45, 47 of the third frame 43 and fourth frame 41 in the direction of travel. The connectors 230 likewise have an elongate square profile portion 231. The connector 230 is also provided with a connection plate 232 protruding laterally from the profile portion 231.

The connection plate 232 has a flange portion 233 projecting downwards and outwards, which at the same time forms a termination of the profile portion 231 or effectively closes the profile portion 231. Fastening points 235 in the form of through-openings 236 are provided in the region of the flange portion 233. Likewise, corresponding fastening points 235 in the form of through-openings 236 are formed on an opposite connection portion 238. The connectors 230 may be connected to the longitudinal portions 45, 47 of the third and fourth frame 43, 41 in a similar, approximately identical, manner, as has already been described above in connection with the connector 130.

The geometric configuration of the connector 230 differs slightly from that of the connector 130. In this way, it can be achieved that the housing 11 is opposite the direction of travel and thus has an oblique profile at its rear end. That is to say that the third frame 43 has a somewhat shorter extension than the fourth frame 41, located therebelow, in relation to the vehicle longitudinal direction (x).

In addition to the connection of the upper and lower ends of the connectors 130, 30 shown in the cross sections of FIGS. 9 and 15, yet further fastening points 39, for example in the form of welding spots, can also be provided in the region of the respective connection plates 130.

Figure 18:
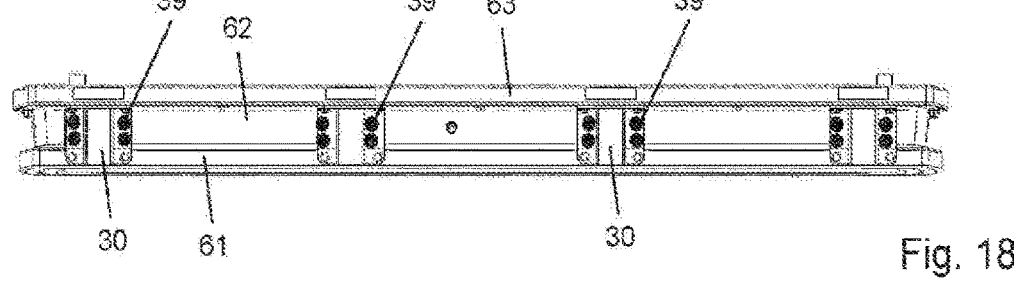
FIG. 18 is a side view of the bottom part.
Figure 19:
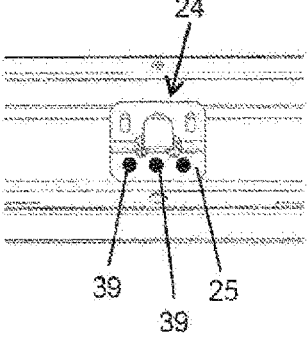
FIG. 19 is a detail view of the inside of the bottom part.

As shown for example in FIGS. 12 and 18, such fastening points 39 can be designed as welding spots, via which the connectors 130, 30 can again be connected separately or individually to the trough 42 or to the side wall element 62. The retaining bracket 24 can also be connected by means of separate fastening points 39, for example in the form of welded connections, to the side wall element 62, in particular to the side wall 70 thereof or the flange portions 71, 72 thereof.

The upper part 14 and the bottom part 16 are directly connectable to one another via their mutually facing second and fourth frames 63, 41. For this purpose, the second frame 63 has a plurality of fastening points 80 which are arranged or formed in a manner complementary or corresponding to fastening points 81 of the fourth frame. Furthermore, a sealing tape or a sealing adhesive can be provided between the second frame 63 and the fourth frame 41, in order to form a closed, i.e. hermetically sealed, cavity 60 after completed mounting of the battery 12 in or on the bottom part 14 after mounting the upper part 14 on the bottom part 16.

Figure 4:
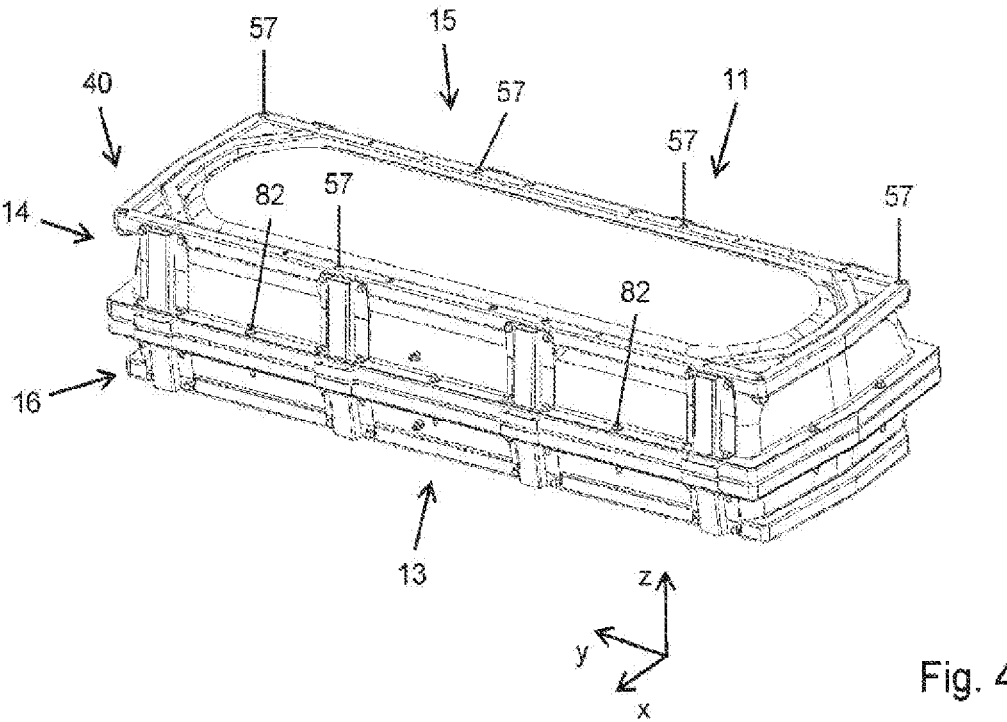
FIG. 4 is a perspective view of the entire battery housing, viewed obliquely from above.

If the fastening points 81 of the fourth frame 41 are arranged in alignment with the corresponding fastening points 80 of the bottom part 16, a mutual connection of the upper part 14 and the bottom part, such as a screw connection or connection of the fourth frame 41 and the third frame 63 by means of separate connecting elements 82, as shown in FIG. 4, can take place.

Overall, a particularly stable housing 11 for the battery 12 can be provided by providing a plurality of frames 61, 62, 41 and 43 which in each case encircle the cavity 60 in the peripheral direction, which housing can protect the battery 12 from damage, even in the event of a vehicle collision. Furthermore, due to the stable configuration of the battery housing 11, a mounting option for the at least one motor vehicle seat 5, 6, and thus a particularly space-saving arrangement of the battery unit 10, can be provided at the same time. The fastening of the at least one motor vehicle seat 5, 6 can take place exclusively via the battery housing 11.

The gas-tight and/or media-tight design of the battery housing 11, in particular of the frames 41, 43, 61, 63 and of the associated or respectively assigned side wall elements 62, or of the lid trough 42, enables the formation of a battery housing 11 which is hermetically sealed towards the motor vehicle interior 3 and ensures that no harmful gases or fluids can penetrate into the vehicle interior 3, even in the event of a malfunction of the battery 12.

The illustrated embodiments merely show possible embodiments of the development, of which further numerous variants are conceivable and are within the scope of the development. The embodiments shown by way of example are not to be interpreted as limiting in any way with regard to the scope, applicability, or configuration possibilities of the development. The present description merely shows a person skilled in the art a possible implementation of an embodiment. Thus, a very wide range of modifications can be made to the function and arrangement of described elements, without in the process departing from the scope of protection or equivalents thereof defined by the following claims.

LIST OF REFERENCE SIGNS 1 motor vehicle
2 motor vehicle body
3 interior
4 drive
5 motor vehicle seat
6 motor vehicle seat
7 seat rail
8 motor vehicle floor
9 side rocker
10 battery unit
11 battery housing
12 battery
13 bottom side
14 upper part
15 upper side
16 bottom part
17 through-opening
18 opening 19 media guide
20 cable
21 cable
24 retaining bracket
25 flange portion
26 cable guide
27 angle bracket
28 spacer
30 connector
31 profile portion
32 connection plate
33 flange portion
34 fastening element
35 fastening point
36 through-opening
37 fastening element
38 fastening element
39 fastening point
40 housing body
41 frame
42 trough
43 frame
44 strut
45 longitudinal portion
46 end-face portion
47 longitudinal portion
48 end-face portion
49 fastening point
50 side wall
51 flange
52 cover portion
57 fastening point
58 fastening point
59 fastening point
60 cavity
61 frame
62 side wall element
63 frame
64 strut
65 longitudinal portion
66 end-face portion
67 longitudinal portion
68 end-face portion
69 reinforcement
70 side wall
71 flange
72 flange
76 fastening point
77 fastening point
78 fastening point
79 fastening point
80 fastening point
81 fastening point
82 fastening element
130 connector
131 profile portion
132 connection plate
133 flange portion
134 fastening element
135 fastening point
136 through-opening
230 connector
231 profile portion
232 connection plate
233 flange portion
234 fastening element
235 fastening point

236 through-opening
238 connection portion

The invention claimed is:

1. A housing for a motor vehicle battery, comprising:
a housing body defining a cavity for receiving the motor vehicle battery,
the housing body comprising an upper side which having a plurality of fastening points adapted to enable one or more motor vehicle seats to be secured to the housing body, and
the housing body comprising a bottom side via which the housing body is fixed to the floor of a motor vehicle.

2. The housing according to claim 1, which further comprises at least one peripheral frame surrounding the cavity.

3. The housing according to claim 1, wherein the housing body is hermetically sealed towards the upper side.

4. The housing according to claim 1, wherein the housing body has a bottom part which is structurally connectable to the floor.

5. The housing according to claim 4, wherein the bottom part has a first frame, by which the bottom part is fixed to the floor.

6. The housing according to claim 5, wherein the bottom part has a second frame which is structurally connected to the first frame.

7. The housing according to claim 6, wherein the first frame and the second frame are structurally interconnected by a plurality of connectors.

8. The housing according to claim 1, wherein the housing body has an upper part, which is structurally connectable to the one or more motor vehicle seats.

9. The housing according to claim 8, wherein the upper part has a third frame, on which the fastening points for the one or more motor vehicle seats are formed.

10. The housing according to claim 9, wherein the upper part has a fourth frame, which is structurally connected to the third frame.

11. The housing according to claim 9, wherein the upper part has a fourth frame, which is structurally connected to the third frame, and wherein the third frame and the fourth frame are structurally interconnected by a plurality of connectors.

12. The housing according to claim 7, wherein the upper part has an upwardly closed one-piece lid trough.

13. The housing according to claim 6, wherein the upper part has a fourth frame, which is structurally connected to the third frame, and wherein the bottom part and the upper part is structurally interconnected by a connection of the second frame to the fourth frame.

14. A battery unit for a motor vehicle, comprising the housing according to claim 1 and comprising a battery arranged in the cavity of the housing.

15. A motor vehicle comprising a motor vehicle body, a vehicle interior, and the housing according to claim 1, which is arranged on a side of the floor of the motor vehicle body facing the interior.

16. A housing for a motor vehicle battery, comprising:
a bottom part adapted to be secured to a floor of a vehicle and comprising a peripheral side wall;
an upper part connectable to said bottom part; said upper part comprising a lid trough, whereby, said upper part and lower part, in combination, define a cavity for receiving the motor vehicle battery,
said upper part further including a plurality of fastening points on an upper surface thereof; said fastening points being adapted to enable one or more motor vehicle seats to be secured to the housing; and
said upper and lower parts each being configured and adapted to enable said housing to support the one or more vehicle seats.

17. The housing of claim 16 wherein:
said lower part comprises a first frame connected to a bottom of said peripheral wall and a second frame connected to a top of said peripheral wall; and
said upper part comprises a third frame surrounding said lid trough and a fourth frame connected to a bottom of said lid trough;
whereby said second frame of said lower part and said fourth frame of said upper part are connected together to connect said upper and lower parts together.

18. The housing of claim 17 comprising a plurality of lower part connectors extending substantially a height of said lower part and a plurality of upper part connecters extending substantially a height of said upper part; said connectors each defining a profile; wherein upper part connectors are aligned with, and are connected to, lower part connectors.

19. The housing of claim 18 wherein the lower part connectors extend between and are connected to said first frame and said second frame and the upper part connectors extend between and are connected to said third frame and said fourth frame.

20. The housing of claim 16 wherein the fastening points are adapted to connect seat rails of the one or more motor vehicle seats to the housing.

* * * * *